May 19, 1953  J. JORDAN  2,638,654
AUTOMATIC WARE PRESSING MACHINE
Filed Jan. 18, 1951  6 Sheets-Sheet 1

FIG. 1

INVENTOR.
JACOB JORDAN
BY
Ely, Fryer & Hamilton
ATTORNEYS

FIG. 2

INVENTOR.
JACOB JORDAN
BY
ATTORNEYS

INVENTOR.
JACOB JORDAN
BY Ely, Frye & Hamilton
ATTORNEYS

May 19, 1953 J. JORDAN 2,638,654
AUTOMATIC WARE PRESSING MACHINE
Filed Jan. 18, 1951 6 Sheets-Sheet 5

INVENTOR.
JACOB JORDAN
BY Ely, Frye & Hamilton
ATTORNEYS

FIG. 8

INVENTOR.
JACOB JORDAN
ATTORNEYS

Patented May 19, 1953

2,638,654

UNITED STATES PATENT OFFICE 2,638,654

AUTOMATIC WARE PRESSING MACHINE

Jacob Jordan, New Castle, Pa., assignor to Shenango Pottery Company, New Castle, Pa., a corporation of Pennsylvania Application January 18, 1951, Serial No. 206,684

10 Claims. (Cl. 25—23)

This invention relates to an automatic die press machine and, more particularly, to a machine for automatically and continuously forming ware pieces from a continuously supplied pug of plastic material, such as a suitable admixture of wet clay.

One method of forming ceramic ware is to provide a pair of moisture absorbing dies of suitable conformation between which a bat of wet clay is pressed under high pressure. Excess moisture in the clay is absorbed by the dies so that upon separation of the dies and removal of the clay from therebetween, an accurately shaped piece of green ware is obtained which needs only to have the flash removed before it is ready for the bisque fire.

Successful ware forming by the above method requires that drainage means be employed for the moisture absorbent dies themselves so that excess water may be drawn away from them. This excess water removal is accomplished by forming hollow passages in the absorbent die and putting these passages under a vacuum which tends constantly to draw moisture through a vacuum line and away from the inside of the die by suction. In order to facilitate separation of the pressed ware from the dies after the pressing operation is completed, it is desirable to introduce pressure into the vacuum lines, tending to blow back water to the surfaces of the dies to moisten the surface of the now relatively dry pressed ware, thereby decreasing adhesion of the ware to the dies and simultaneously tending to blow or force the ware from the dies.

After a number of pieces have been pressed according to this method it is desirable to "purge" the dies by keeping pressure on the vacuum lines for a relatively protracted length of time while the dies are separated and removing the water thereby forced to the surface by suitable means such as the wiping action of an air blast.

While a manually controlled, manually loaded and manually unloaded absorbent die press can be used to form satisfactory pressed ware, operation of such a device is inherently cumbersome. From a time and motion viewpoint, awkward movements, requiring time and skill to master, are necessary to handle the wet clay and to position it carefully between the dies. Care, skill, and awkward movements are also required in removing the pressed ware from between the dies. To keep the moisture content of the dies below an objectionable amount, either the dies must be "purged" after each pressing operation which consumes a prohibitive amount of time or the dies must be purged periodically which is time-consuming to a lesser degree and which entails a varying (gradually increasing) moisture content of the absorbent dies between purges despite the exhaust of some moisture through the vacuum line.

The present invention overcomes the above disadvantages and provides a machine which will automatically and continuously perform the full cycle of operations involved in the ware pressing process. The present invention does not merely contemplate duplication of the operations previously performed by hand; assuming such a machine could be built it would be prohibitively expensive and intricate and therefore impractical. The present invention, rather, utilizes the ability to control the surface moisture content of the absorbent die in such a manner as to make possible a relatively simple series of operations including loading and unloading by gravity. In order to decrease the time required for each individual pressing operation, the invention also provides novel means for varying the speed of the first of the two mating absorbent dies involved in each individual pressing operation as the first die is moved toward the other die. The machine requires the attention of only unskilled labor and, moreover, greatly reduces the number of man hours required to produce each thousand dozen pieces. Also, there is more uniform moisture absorption by the dies since means are provided for purging each die during the time interval between successive pressing operations of that given die.

A primary object of the invention is to provide a fully automatic continuous ware pressing machine.

Another object of the invention is to provide a ware pressing machine with high unit output.

A further object of the invention is to provide a ware pressing machine capable of operation by unskilled labor.

A still further object of the invention is to provide a machine which will automatically purge absorbent ware press dies during each cycle of their operation.

Another prime object of the invention is to provide a method for continuously automatically pressing ware.

A further object of the invention is to provide a method for automatically pressing ware which makes possible accurate and constant control of the amount of moisture removed from the plastic material which is stamped.

Figure 1:
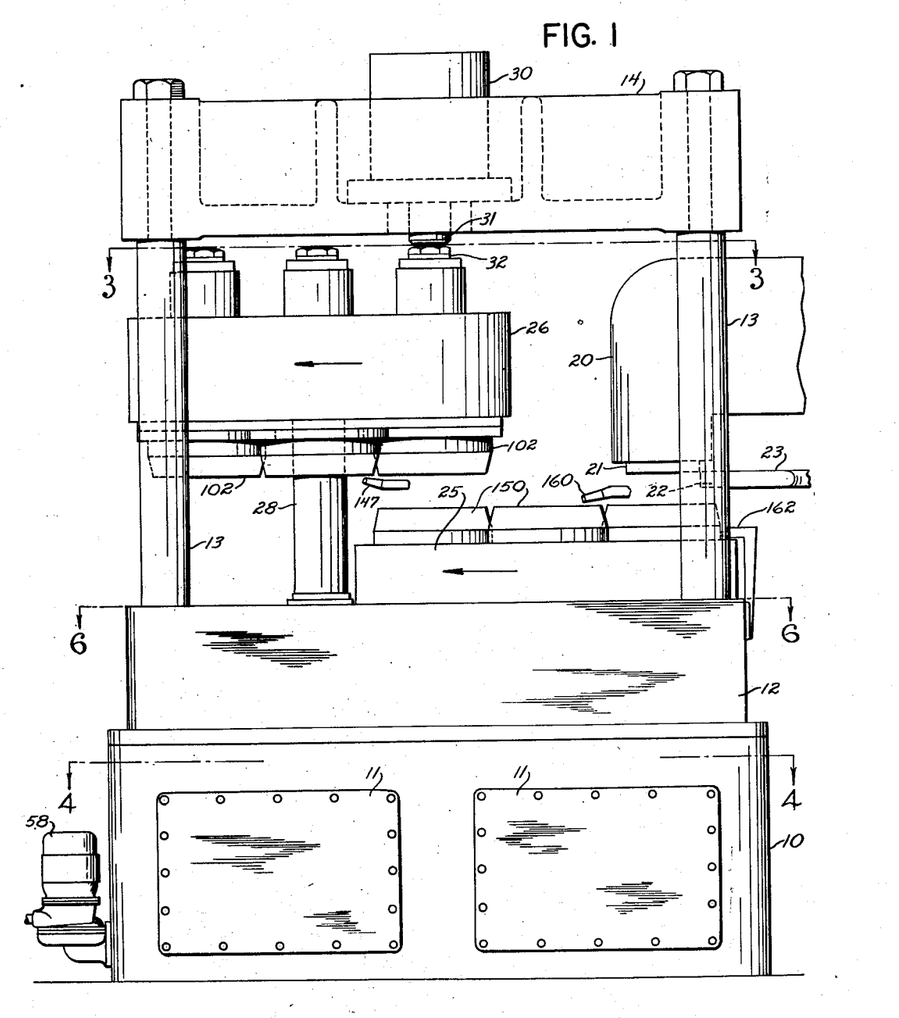
Figure 1 is a side elevation of my invention.

The complete ware pressing machine is most clearly seen in Figure 1. Resting on the floor is a hollow rectangular casting 10 having access panels 11 provided therein. Fixed immediately above casting 10 is a hollow rectangular casting 12. Secured in the casting 12 are four columns 13 which support on their top ends a hollow rectangular casting 14. Mounted between the castings 12 and 14 are two overlapping turrets, 25 and 26, each rotatable about its own vertical axis.

Rather than by further cataloguing the various main elements, the general organization of the invention can be more effectively explained by briefly tracing the steps through which a piece of clay passes from the time it is cut from the slug delivered by an associated pug mill until the time it is carried away from the machine as a piece of formed green ware.

The output end 20 of a pug mill delivers a slug of wet clay 21. A bat is cut from this slug by a blade 22 carried on a reciprocating fork 23. The bat falls a short distance onto a lower moisture absorbent die at the loading station A (see Figure 3) of the lower turret 25.

The bat is then intermittently advanced along with its associated die through 90° in the direction indicated in Figure 1 to the station B and from there to the pressing station C. Upon each intermittent advance of the lower turret 25 through 90° the upper turret 26 is also advanced 90° in the direction indicated in Figure 1. After the clay bat reaches the pressing station C a hydraulic cylinder 30 forces a plunger 31 down. The plunger 31 in turn forces down a reciprocating die shaft assembly 32, only the tip of which can be seen in Figure 1. This die shaft assembly is one of four such assemblies, each of which is slidably carried on turret 26. The absorbent die plate associated with the particular die shaft assembly engaged by the plunger 31 is forced down therewith until the clay bat at station C is squeezed between the upper and lower dies at that station under high pressure in a manner more fully explained below.

During the above operations there is a constant vacuum on the particular lower die involved. As the pressing operation is completed pressure is introduced into this lower die by means fully set forth below, thereby forcing a film of water to the die surface. As a result, when the cooperating dies at Station C are separated the pressed bat is released from the lower die and adheres to the upper die to be carried upward therewith. The dies are separated by causing the air cylinder 30 to retract the plunger 31 since the die shaft assembly 32 always tends to return to its top limit as will be more fully explained below.

Figure 2:
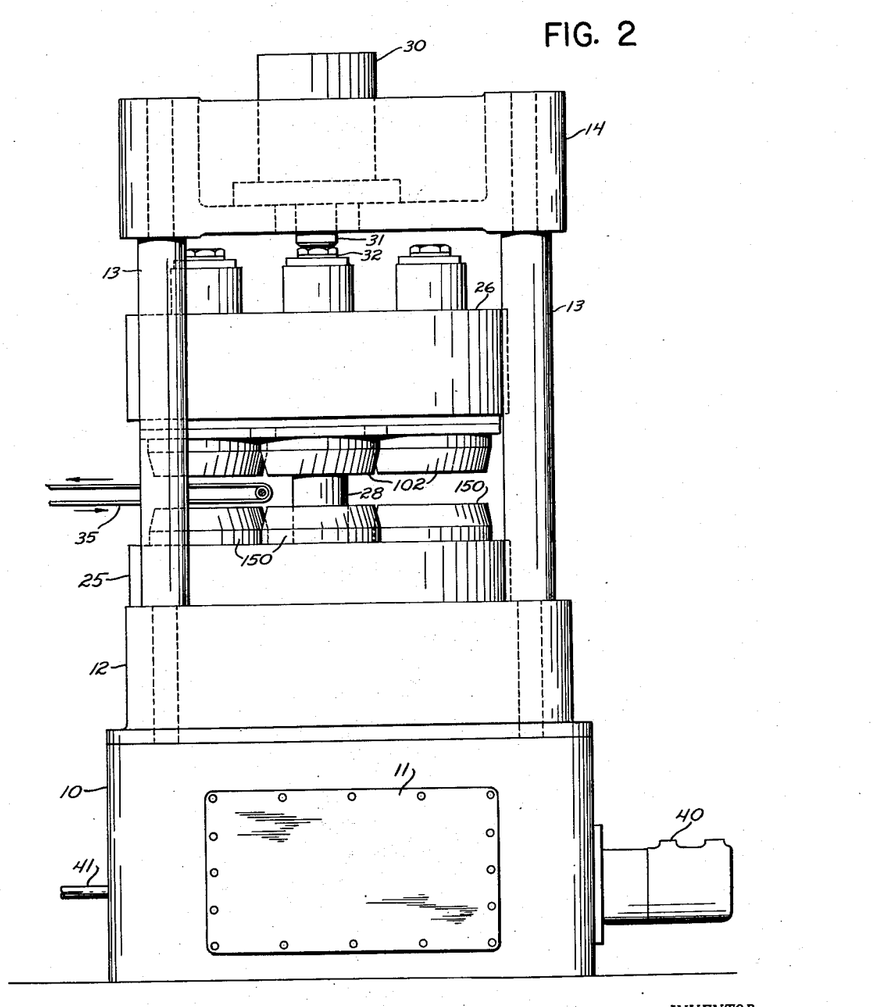
Figure 2 is an end view of the same, many minor elements being omitted for clarity of illustration.

On the succeeding 90° step of the turrets, the pressed bat is carried by the top turret to the unloading station D. At this station pressure is introduced into the normally evacuated air line of the particular top die concerned and this pressure together with formation of the resultant moisture film on the die acts to release the pressed bat so that it drops a very small distance to the surface of a conveyor belt 35 which has been omitted in Figure 1 for purposes of clarity but which may be seen in Figure 2.

Intermittent turret drive

Located on the rear wall of the hollow casting 10 is a hydraulic motor 40 which drives a shaft 41. Fixed to the shaft 41 is a worm 42. Rotatably mounted in the castings 10 and 12 is a vertical shaft 43. Fixed on the shaft 43 is a spur gear 44 in meshing engagement with the worm 42. Also fixed on the shaft 43 are two pairs of drive plates 45, 46 and 47, 48. Fixed on the shaft 43 between the drive plates 45 and 46 is a lock member 49. Another lock member 50 is fixed on the shaft 43 between the drive plates 47 and 48. Rotatably mounted in drive plates 45 and 46 near their radial extremities is a drive pin 51. Rotatably mounted in drive plates 47 and 48 near their radial extremities is second drive pin 52.

Figure 6:
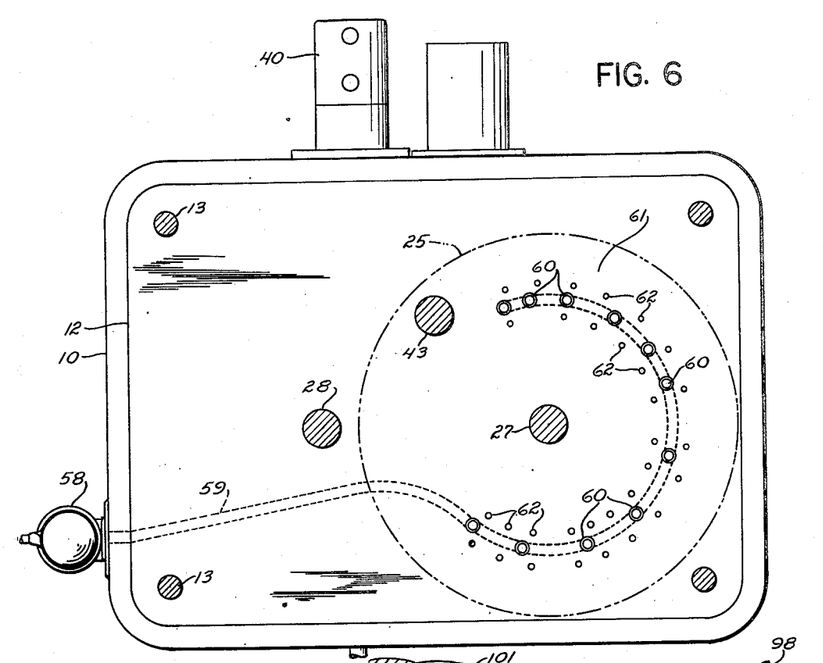
Figure 6 is a section taken on line 6—6 of Figure 1.

Rotatably mounted in the castings 10 and 12 are vertical turret shafts 27 and 28. The shaft 27 extends above casting 12 to turn the lower turret 25. The shaft 28 extends above the casting 12 to turn the upper turret 26. The lower turret 25 is mounted on the hydrostatic oil bearing illustrated in Figure 6. An oil pump 58 pumps oil from the bottom of casting 10 through the line 59. The oil flows out of the openings 60 in this line onto the planar bearing surface 61 thus forming a film of oil on which the lower turret 25 is rotatably supported. Excess oil drips down through drain holes 62 to the pump formed by the bottom of the casting 10.

Fixed to the shaft 27 is a driven member 55 having slots 56 and concave peripheral surfaces 57. Fixed to the shaft 28 is a similar driven member 58 having slots 59 and concave peripheral surfaces 60. The vertical distance between driven members 55 and 58 is the same as the vertical distance between the drive pins 51 and 52.

The vertical shaft 43 is constantly driven by the motor 40 through the linkage or train of the shaft 41, the worm 42, and the gear 44. The shaft 43, in turn, carries around with it at a constant angular velocity the drive plates 45, 46, 47 and 48 together with the lock members 49 and 50 and the drive pins 51 and 52. This arrangement forms a pair of Geneva drives with the drive pin 51 engaging the slots 59 and the drive pin 52 engaging the slots 56.

The drive pin 52 is angularly spaced 90° ahead of the drive pin 51 so that at the moment the pin 52 engages one of the slots 56, the pin 51 engages one of the slots 59.

During one quarter of a revolution of the shaft 43, the drive pins are in engagement with their respective slots to advance the driven members 55 and 58. During the remaining three quarters revolution of the shaft 43 the driven members 55 and 58 are held stationary by the circular segment of the periphery of each of the locking members 50 and 49 which engage with whichever one is presented of each of the groups of concave peripheral surfaces 57 and 60, respectively.

*Plunger actuation*

Driven from the constantly rotating shaft 43 by a suitable bevel gear drive is a shaft 70 having mounted thereon the radial cams 72 and 73. These cams 72 and 73 periodically operate four-way valves 77 and 78, respectively, in timed relation with the motion of the turntables 25 and 26. The valves 77 and 78 are part of the plunger control hydraulic system illustrated schematically in Figure 9.

Figure 9:
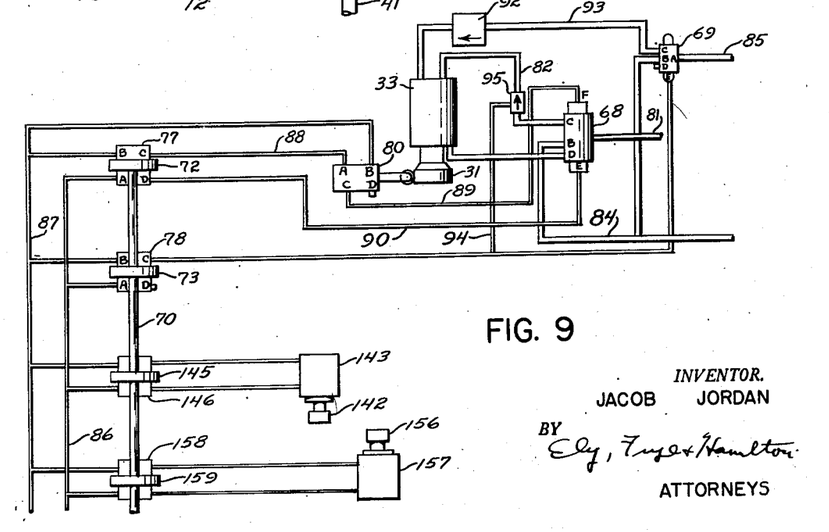
Figure 9 is a schematic representation of the hydraulic system used in the invention.

As indicated in this figure, the die actuating plunger 31 is actuated by a hydraulic cylinder 33. The hydraulic lines carrying fluid to and from this cylinder 33 may be referred to as "primary" lines, flow through which is directly controlled by the large primary valves 68 and 69. The remaining hydraulic lines and valves serve merely to control the action of the primary valves 68 and 69 and may therefore be referred to as "pilot" lines and valves.

The primary line 81 delivers fluid to the primary valve 68 from a suitable source (not shown) which has a capacity of 80 gallons per minute and delivers fluid under a pressure of 200 p. s. i. The primary line 85 delivers fluid to the primary valve 69 from a suitable source (not shown) which has a capacity of 15 gallons per minute and delivers fluid under a pressure of 1,000 p. s. i. A pilot line 86 delivers fluid to the pilot valves 77 and 78 from a suitable source (not shown).

In Figure 9, the ports of the primary valves, 68 and 69, and the pilot valves 77, 78 and 80 are all labeled in a similar manner, A, B, C, and D. A designates the pressure port, B the return port, and both C and D are ports connected to operating lines. In the case of secondary valves 77, 78, and 80, in one valve position A communicates with C and B communicates with D while in the opposite position A communicates with D and B with C. There is no neutral position of these valves. The ports of the primary valves 68 and 69 communicate in a similar manner in the two alternate limit positions of these valves but both these primary valves also have a neutral position in which port A is closed off and C and D both communicate with B. Both these primary valves are normally spring urged to neutral position. The ports D of the pilot valves 78 and 80 and of the primary valve 69 are plugged.

For convenience in discussing Figure 9, the various individual ports will be identified below by the identifying number of the valve followed by the identifying letter of the port, as for example, 77A.

Initially the cam followers on the pilot valves 77 and 78 are both in lowered position so that 77A and 77D communicate and 78A and 78D communicate. Pressure from the line 86 thus passes through line 90 into 68E to position the valve 68 so that 68A and 68D communicate as do 68B and 68C. Pressure from the high volume primary line 81 thus passes through line 83 into the cylinder 33 to urge the plunger 31 up. In this position the plunger 31 is out of contact with the follower of the valve 80 so that 80A and 80C communicate and 80B is closed off.

At the proper time for actuation of the plunger 31, the cam 72 raises the cam follower of the valve 77. Pressure now flows from line 86 through 77A and 77C, line 88, 80A, 80C, and line 89 to 68F to reverse the valve 68 so that primary pressure flows from high volume line 81 through 68A, 68C and line 82 to the top of the cylinder 33. A check valve 92 prevents the escape of the fluid through the line 93, so that the fluid forces the plunger 31 downwardly. The downward motion is extremely rapid due to the high volume capacity of the fluid source (not shown) to which the line 81 leads. Fluid in the bottom of the cylinder 33 is dumped through line 83, 68D, 68B and the dump line 84.

As the plunger 31 rapidly moves down, it strikes the follower of the pilot valve 80, shifting the position of this valve. The port 80A is thus closed off and 68F communicates with the pilot dump line 87 through line 89, 80C, and 80B. Meanwhile, 68E is also vented to the pilot dump line 87 through line 90, 77D and 77B. The valve 68 thus shifts to its neutral position so that the primary lines 82 and 83 both communicate with the primary dump line 84 and the plunger 33 stops moving. The internal orifices of the valve 68 are arranged so that momentarily during movement to the neutral position all ports are closed. This serves to provide a momentary positive hydraulic lock in the lines 82 and 83 in order (in cooperation with the plastic resistance of the clay between the dies) to overcome the inertia of the very rapidly moving plunger 31. A pressure relief valve may be provided to guard against rupture of the line 83 at this time.

The plunger 31 is now at rest after having rapidly completed the major part of its downward movement. Actuation of the pilot valve 78 by the cam 73 now serves to initiate the remaining high pressure movement of the plunger. The cam 73 may be adjustably mounted so that the interval during which the plunger remains at its intermediate stage of rest may be varied. After the cam 73 raises its associated follower pilot pressure flows from the line 86 through 78A, 78C, and line 91 to 69E, thereby shifting the primary valve 69 from neutral so that primary pressure may flow from line 85 through 69A, 69C, and line 93 to the cylinder 33. A branch line 94 leads from the line 91 to normally open check valve 95 located in the line 82. Pressure in the line 94 thus closes off the line 82 so that the primary pressure acting through the line 93 acts to relatively slowly force the plunger 31 further down under extremely high pressure to complete the pressing operation.

Shortly thereafter the cam 73 allows its associated follower to drop, causing the primary pressure from the line 85 to be cut off. After several more degrees of rotation, the cam 72 allows its associated cam follower to rise thus causing 77A to communicate with 77D which in turn causes 68A and 68D to communicate so that primary pressure from the line 81 returns the plunger to its upward position to complete the full sequence of operations of the plunger control hydraulic system.

*Die vacuum and pressure system and reciprocal mountings for upper dies*

Figure 3:
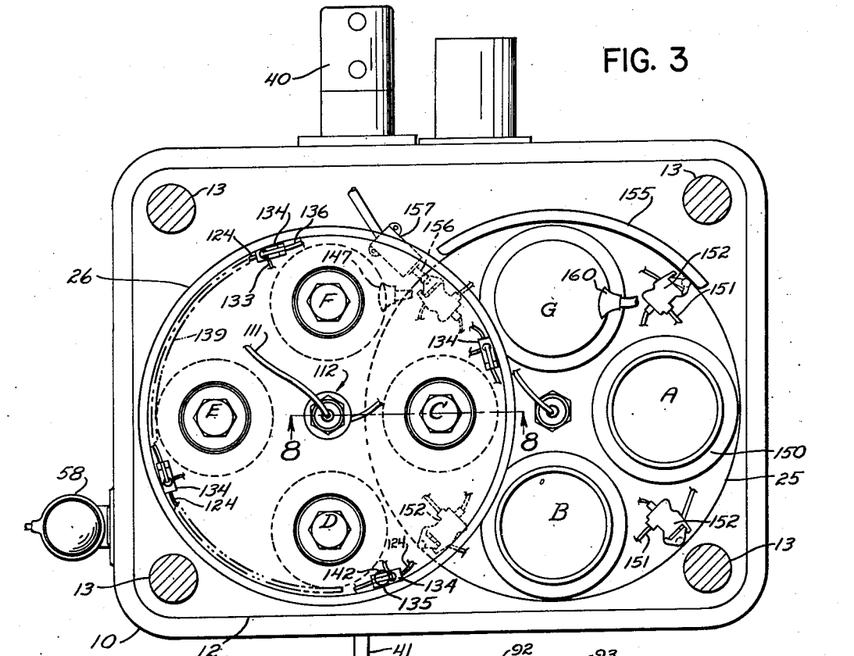
Figure 3 is a section taken on line 3—3 of Figure 1.
Figure 4:
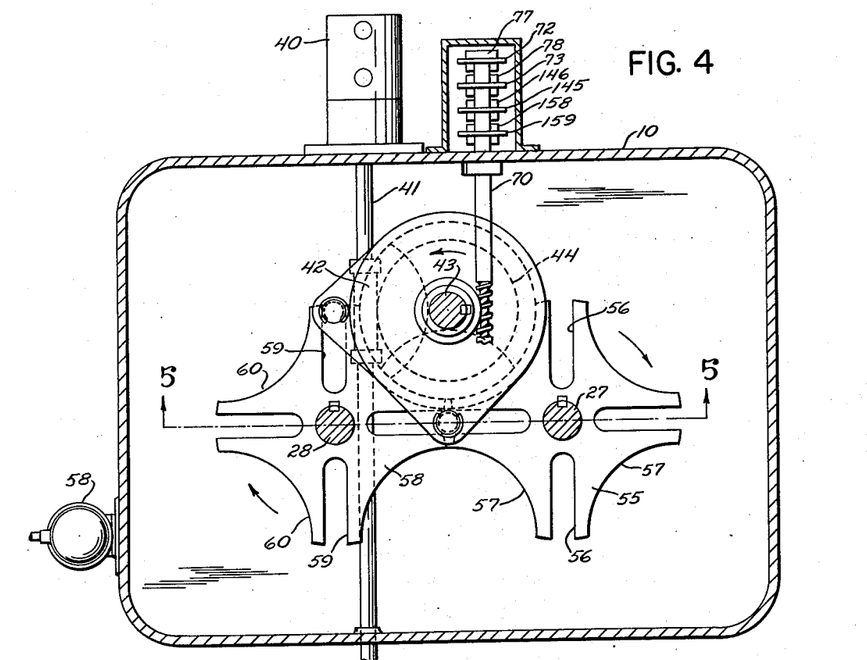
Figure 4 is a section taken on line 4—4 of Figure 1.
Figure 5:
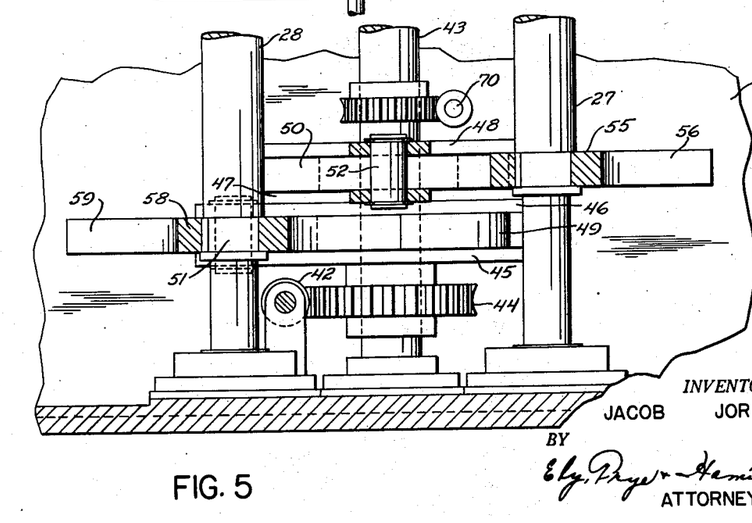
Figure 5 is a section taken on line 5—5 of Figure 4 on a slightly enlarged scale.

As may be seen in Figures 1 and 3, each of the turrets 25 and 26 has four dies mounted on it. The dies on the turret 25 are fixed to this turret. The dies on the turret 26 are mounted for vertical reciprocation on reciprocating die shaft assemblies 32, one of which is illustrated in cross-section in Figure 8.

Figure 8:
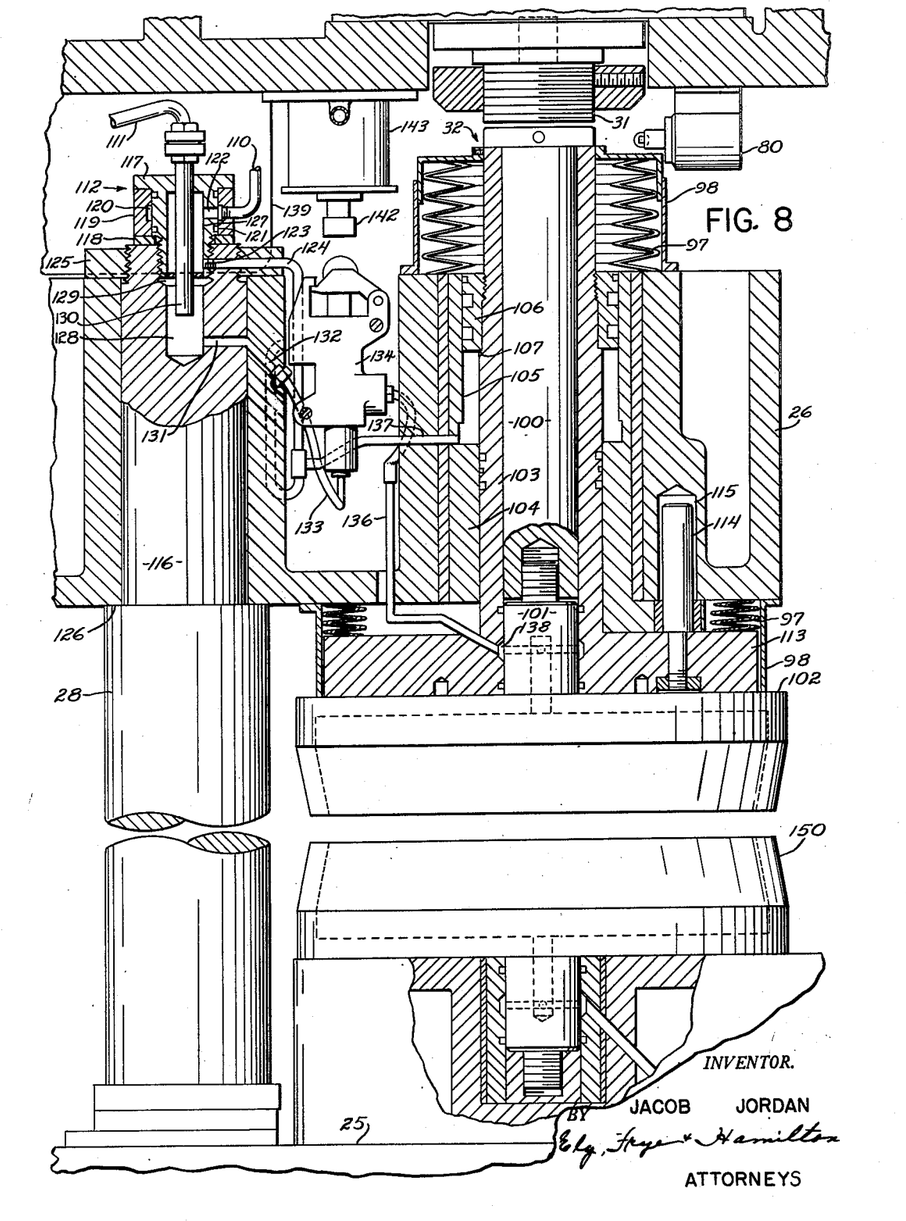
Figure 8 is a section taken on line 8—8 of Figure 3 with the foremost pressure-vacuum valve and the valve actuating plunger superimposed thereon.

Each die shaft assembly comprises a central shaft 100 threadedly receiving at its bottom end a stud formed on the shank 101 of the chuck gripping member 102. Surrounding and secured in any suitable manner to the shaft 100 is sleeve 103 having a backing face 113. Surrounding the sleeve 103 is a sleeve 104 having an enlarged bore portion 105 formed therein. Received in the bore 105 is a piston 106 threadedly secured on the sleeve 103 against the shoulder 107. There is a sliding fit between the sleeve 103 and the piston 106 as a unit and the sleeve 104. Upwardly extending from the backing face 113 is a pin 114 received in the slot 115 formed in the turret 26. The pin and slot serve to hold the reciprocating die shaft assembly 32 against rotation relative to the turret 26.

The bellows 97 and shields 98 are provided at each end of the reciprocating die shaft assembly 32 to shield the sliding surfaces from dirt and excess clay.

A pressure line 110 and vacuum line 111, the former connected to an air pressure source and the latter to an air vacuum source (not shown), lead into the intermittently revolving turret 26 through a distributing head generally indicated at 112. Threadedly received on the reduced portion 116 of the shaft 28 is a plug 117, which bears against a washer 118. Rotatably received between the plug 117 and the washer 118 is a collar 119 having an annular groove 120 formed therein. Sealing rings 121 are carried in slots formed in the plug 117. Communicating with the bore 127 of the plug 117 are two radial passages, 122 and 123. The passage 123 is threaded to receive a line 124 which is passed through suitable passages in the reduced portion 116 of the shaft 28 and in a nut 125 which serves to clamp the turret 26 against the shoulder 126. The passage 122 communicates with the annular groove 120. The pressure line 110 leading from a suitable source of air pressure (not shown) is threadedly received in the collar 119 and communicates with the annular groove 120. A bore 128 is formed in the reduced portion 116 of the shaft 28 and it is the upper portion of this that is threaded to receive the plug 117 and also a disc 129. The disc 129 and plug 117 rotatably receive a pipe 130 which is coupled to the vacuum line 111. The bore 128 communicates with a radial passage 131 formed in the reduced portion 116. The passage 129 in turn communicates with a passage 132 having a suitable connection to the line 133.

The line 124 communicates with one port of a valve 134, while the line 133 communicates with another port of this valve. Similar connections from the lines 124 and 133 run to three other valves, identical to the valve 134 and corresponding to the three remaining die operating assemblies on the turret 26. When the roller 135 of the valve 134 is in normal raised position the line 133 communicates with the valve outlet line 136 while the line 124 is cut off. When the roller 135 is depressed the line 124 communicates with the valve outlet and the line 133 is cut off. For ease of illustration, the line 136 from the valve 134 in Figure 8 is shown as connected to the die shaft assembly 32 at station C, although this particular valve actually is connected to the die shaft assembly 32 at station D.

Branching off the line 124 is a line 137 which communicates with the chamber defined by the bore 105. This line continuously admits air under pressure to continuously urge upwardly the piston 106 and the associated die shaft assembly 32.

The line 136 communicates with an annular groove 138 formed in the backing face 113. The groove 138 communicates with suitable drilled passages in the shank 101 which, in turn, open upon the inside face of the chuck gripping member 102 to communicate with spiral passages 141 formed in the absorbent die 142. Thus, when the roller 135 is raised, vacuum is applied to the absorbent die 142 and when this roller is depressed, pressure is applied to absorbent die 142.

The roller 135 is normally urged to upward position by a spring (not shown) within the body of the valve 134. This roller 135 is lowered by contact with the cam ridge 139 or by extension of the plunger 142 which is actuated by a small hydraulic cylinder 143. This cylinder is mounted on the casting 14 in such a position that as a given die shaft assembly 32 reaches the station D, its associated valve 134 lies directly under the plunger 142. The operation of the plunger 142 is controlled in timed relation to movement of the turrets by a cam 145 (see Figure 9) mounted on the shaft 70 which operates a four-way valve 146 similar to the valves 77 and 78. The valve 146 reverses the direction in which pressure runs in the lines leading to the cylinder 143 to raise and lower the plunger 142 depending on whether the cam follower of the valve 146 is raised or allowed to fall by the cam 145. The cam 145 is angularly adjusted on the shaft 70 so that after a given upper die has been at rest at station D a very short time the plunger 142 operates to depress the roller 135 of the valve 134 associated with the given upper die. Air is thereby blown back into the upper die forcing a film of moisture to the surface of the die thereby causing release of the pressed ware. The conformation of the cam 145 is such that shortly before or after subsequent advance of the turrets, the plunger 142 is returned to its up position, causing the roller 135 either to be raised while the turret is stationary or to roll off the plunger 142 as the turret starts to rotate.

The provision of this plunger 142 provides for an accurate control of the time of release of the ware after the given upper die has come to rest at station D, as is explained above. To provide for further application of back pressure to this upper die during its rotation through stations E and F so that the die may be fully purged of excess moisture before its next pressing operation, the cam ridge 139 is provided. The roller 135 is depressed by this cam ridge shortly after the upper die leaves station D and is released shortly after the upper die reaches station F. The location of this cam ridge 139 is shown in phantom view in Figure 3. At station F the removal of purged moisture from the die may be aided by suitable wiping means such as an air blast directed from an air nozzle 147.

The upper valves 134 are vertically mounted while the lower valves 152 are horizontally mounted simply because it has been found expedient to so mount these respective groups of valves.

Figure 7:
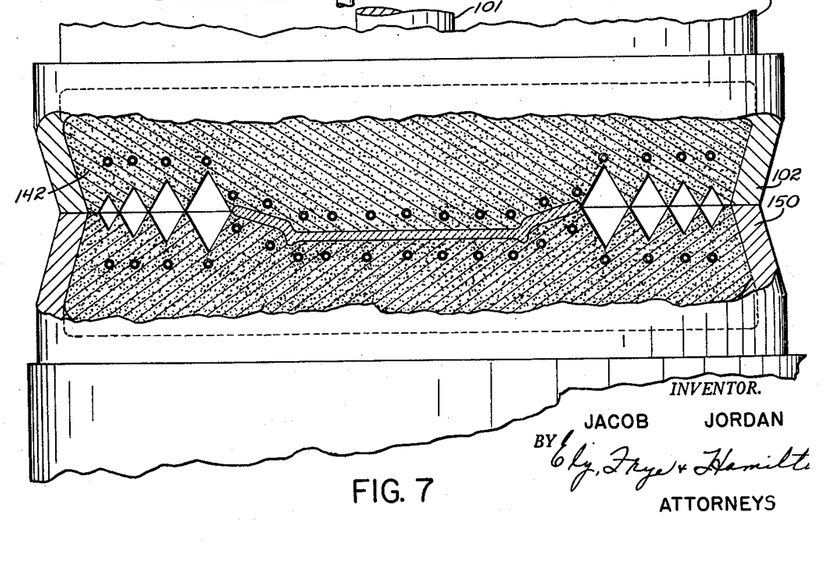
Figure 7 is a sectional view of a pair of mating absorbent dies with a piece of newly formed green ware therebetween.

As may be seen in Figures 7 and 8 each of the bottom chucks and chuck gripping members 150 is provided with passages similar to the passages 138 and 141. Pressure and vacuum on each bottom chuck is controlled through the line 151 by an associated valve 152. There are four valves 152, each associated with one of the lower dies. Pressure and vacuum is distributed to these valves through a distributing head 153 (see Figure 3) similar to the distributing head 112. Rollers 154 on each valve 152 are raised or lowered either by the cam ridge 155 or by the plunger 156 which is operated by a hydraulic cylinder 157 controlled in turn by a valve 158. The cam follower associated with the valve 158 is depressed by the cam 159 adjustably mounted on the shaft 70. The plunger 156 is located so that as a given lower die is at station C the roller on its associated valve 152 is adjacent to plunger 156. The cam 159 is set so that the valve 158 is depressed just after the pressing operation at station C has been completed. This forces a film of water to the surface of the lower die at station C so that as the dies are separated the pressed ware will separate easily from this lower die and be carried upward by the upper die. As the lower die leaves station C the roller on its associated valve 152 leaves the plunger 156 and the valve thus momentarily re-applies vacuum to the chuck. The valve roller soon engages the cam ridge 155, however, and pressure is re-applied to the die. The die is thereby purged as it moves to the station G. At this station excess moisture is removed as by a high pressure air blast delivered from a nozzle 160. The cam ridge 155 terminates shortly beyond this station so that vacuum is applied to each die as it reaches the loading station A.

*Operation*

The operation of the invention has been outlined above but is repeated here in greater detail.

As a lower die reaches station A it is under vacuum. A switch 162 is tripped by the lower die causing one reciprocation of the blade 22 to cut off a bat of clay from the extrusion 21 being delivered by the pug mill 20. The bat falls on the lower die.

On the next intermittent advance of the turrets the bat is carried to station B. No operation is performed at this station.

On the next intermittent advance of the turrets the bat is carried to the pressing station C. Shortly after it arrives the valve 77 is tripped by its cam 72 to initiate rapid downward movement of the plunger 31. This rapid downward movement is checked by the valve 80. Shortly thereafter the valve 78 is tripped by its cam 73 to initiate the final slow downward movement of the plunger 31 to cause the dies at station C to subject the bat to very high pressure. Both the upper and lower die are under vacuum during the squeezing operation so that excess moisture is drawn out of the clay by the absorbent dies.

As the dies finally come together the valve 158 is tripped by its cam 159 to raise the plunger 156. The associated valve 152 is thereupon tripped to blow moisture back to the surface of the lower die. Shortly after this is done the valve 78 is tripped by the cam 73 causing the upper die to be raised. The moist lower die easily parts from the pressed ware which adheres to the upper die and is carried up therewith.

Upon the next intermittent advance of the turrets, the roller on the particular valve 152 leaves the plunger 156 but is almost immediately re-depressed by the cam ridge 155 so that purging of the lower die is thereby initiated. Meanwhile, the upper die advances to unloading station D. After it comes to rest at this station the valve 146 is tripped by the cam 145 to extend the plunger 142 and actuate the then associated valve 134 to blow moisture back to the surface of the upper die and thereby release the ware so that it drops onto the conveyor belt 35.

On the next succeeding intermittent advance the roller on the particular valve 134 rolls off the plunger 142 but is almost immediately re-depressed by the cam ridge 139 so that purging of the upper die is thereby initiated.

Purging of the lower die continues during the majority of the movement of this die from the station C to the station G. The wiping action of the air blast directed from the nozzle 160 at station G aids in removing the purged moisture from the surface of the die. Shortly after the lower die leaves this station the cam ridge 155 terminates allowing the particular valve 152 to return to the die vacuum applying position.

Purging of the upper die continues during the majority of the movement from station D to station E, during rest at station E, during movement from station E to station F and during rest at station F. A nozzle 147 similar to the nozzle 160 may be located at this station F. Shortly after the upper die leaves this station the cam ridge 139 terminates, allowing the particular valve 134 to return to the die vacuum applying position.

It will be apparent that this invention is not limited to the particular embodiment disclosed above but that alterations in this embodiment may be made within the scope of the present invention. For example, die wiping means other than the air nozzles 147 and 160 may be provided or station B may be made the loading station to allow for purging of the lower dies through a greater angular displacement. Accordingly, the scope of the invention is defined by the following claims.

What is claimed is:

1. In a ware presser, a first moisture absorbent open-faced die, a second moisture absorbent open-faced die adapted to mate with said first die when said dies are in axially aligned position, means to deposit moist plastic material on said first die when said dies are in axial misalignment, means to axially align said dies, means to axially compress said dies together while they are axially aligned thereby to form said moist plastic material and to remove excess moisture therefrom, means to axially separate said dies, means to decrease adhesion of said plastic material to said first die at the initiation of said axial separation whereby said plastic material will temporarily adhere to said second die, means to axially misalign said dies, conveyer means passing under said second die and facing said second die in one of its axially misaligned positions, and means to decrease adhesion of said plastic material to said second die while said second die is in said one of its axially misaligned positions thereby to cause separation of said plastic material from said second die and transposition of said plastic material away from said dies by said conveyer.

2. A device as defined in claim 1 wherein said first die is positioned relatively lower than said second die.

3. A method of forming potteryware which comprises dropping moist plastic material on the first of a pair of absorbent dies, squeezing said material between the pair of dies to shape the material and expel excess moisture therefrom into the dies, blowing moisture back to the surface of the first die, separating the dies and blowing moisture back to the surface of the second die.

4. In a ware die press a lower turret carrying a lower set of moisture absorbent open-faced dies, an upper turret carrying an upper set of moisture absorbent open-faced dies, means to concurrently advance said turrets, said turrets overlapping at a station so that successive complementary pairs consisting of an upper and a lower die are moved into juxtaposition at said station upon advance of said turrets, actuating means to compress each of said successive complementary pairs of dies together, conveyer means passing under and adjacent to said upper die at other than said turret overlapping station, said conveyer extending away from said ware die press, means to exhaust air and moisture from and to blow air and moisture back into each of said upper and lower absorbent dies at preselected times during the cycle defined by one complete rotation of each of said upper and lower dies on its associated turret, said preselected time for blowing air and moisture back into each of said upper dies being the time during which each of said upper dies is positioned above said conveyer means.

5. A device for forming ware from wet clay comprising a frame, a pair of rotatable turrets mounted in said frame, a plurality of moisture absorbent dies mounted on each of said turrets, said turrets overlapping to allow successive juxtapositioning of dies mounted on one of said turrets with dies mounted on the other of said turrets, each individual die having a die control valve associated therewith and mounted for rotation with the same turret on which the individual die is mounted, each of said die control valves having a first pressure-vacuum outlet port communicating with the interior of its associated moisture absorbent die, a second pressure supply port, a third vacuum supply port, means supplying pressure to each of said second ports, means supplying vacuum to each of said third ports, each of said valves comprising shifting means to alternatively operatively connect said first port with said second and third ports and actuating means to actuate said shifting means at preselected times during the cycle defined by one complete rotation of each of said die control valves along with its associated turret.

6. In a pottery ware press, means to deposit moist clay on an open-faced upwardly facing press element, means to compress the clay between said upwardly facing press element and an open-faced downwardly facing press element to form the clay and remove moisture therefrom, means to cause the clay to adhere to said downwardly facing press element upon separation of said press elements, a conveyer extending away from the vicinity of said press elements, means to transpose said downwardly facing press element to a position immediately over said conveyer and means to release the clay from said downwardly facing press element whereby said clay is gently deposited on said conveyer and carried away from said press.

7. In a ware press, at least one pair of dies permeable by moisture, means to deposit wet clay therebetween, means to squeeze said pair of dies together, means to substantially decrease adhesion between said clay and one of said pair of dies during the time said dies are squeezed together, means to separate said dies whereby said clay adheres to the other of said pair of dies, and means to substantially decrease adhesion between said clay and said other of said pair of dies during the time said pair of dies is separated, all of said means automatically operating in a continuous cycle.

8. A press for ceramic clay including a frame, a first turret mounted in said frame and rotatable past a loading station and a pressing station, a second turret mounted in said frame and rotatable past said pressing station and an unloading station, clay receiving means and turret drive means associated with said first turret to carry clay from said loading station to said pressing station, means to press said clay at said pressing station between said clay receiving means and cooperating means associated with said second turret, means to transpose said clay to said cooperating means upon completion of said pressing, means associated with said second turret to carry said clay from said pressing station to said unloading station and means associated with said second turret to unload said clay at said unloading station.

9. The method of forming potteryware comprising dropping a bat of wet plastic clay on a first moisture permeable die, vertically aligning said first die with a second complementary moisture permeable die, bringing said dies together to squeeze and form the plastic clay and to expel excess moisture therefrom into the dies, introducing back pressure into said first die, separating said dies, vertically misaligning said dies, introducing back pressure into said second die.

10. In a ware forming press a frame, a turret mounted for rotation in said frame, a plurality of moisture permeable dies mounted on said turret and radially spaced from the axis thereof, intermittent drive means to intermittently advance said turret to intermittently successively advance each of said moisture permeable dies to a certain location relative to said frame and to continue to advance each of said dies therefrom through a complete rotation of said turret to define a cycle for each of said dies, actuating means mounted on said frame and cooperating means on said turret to introduce pressure into the interior of each of said dies during a portion of the time they are at rest at said location and cam means on said frame to coact with said cooperating means on said turret to introduce pressure into the interior of each of said dies during preselected portions of the remainder of said cycle of each said dies.

JACOB JORDAN.

References Cited in the file of this patent

UNITED STATES PATENTS

| Number | Name | Date |
|---|---|---|
| 1,505,042 | Leigh | Aug. 12, 1924 |
| 1,613,500 | Chamberlain | Jan. 4, 1927 |
| 1,717,996 | Moore, Jr. | June 18, 1929 |
| 1,759,058 | Miller | May 20, 1930 |
| 1,906,566 | Friedl | May 2, 1933 |
| 2,183,869 | Randall et al. | Dec. 19, 1939 |
| 2,200,998 | Schnuck | May 14, 1940 |
| 2,278,513 | Emerson | Apr. 7, 1942 |
| 2,354,029 | Kingston | July 18, 1944 |
| 2,358,353 | Stacy | Sept. 19, 1944 |